United States Patent
Gerlach

(10) Patent No.: US 7,743,898 B2
(45) Date of Patent: Jun. 29, 2010

(54) CLUTCH ARRANGEMENT HAVING A RADIALLY NESTED DESIGN

(75) Inventor: Martin Gerlach, Ladenburg (DE)

(73) Assignee: BorgWarner, Inc., Auburn Hills, MI (US)

( * ) Notice: Subject to any disclaimer, the term of this patent is extended or adjusted under 35 U.S.C. 154(b) by 348 days.

(21) Appl. No.: 11/441,308

(22) Filed: May 25, 2006

(65) Prior Publication Data

US 2006/0266612 A1 Nov. 30, 2006

(30) Foreign Application Priority Data

May 25, 2005 (EP) ................... 05011339

(51) Int. Cl.
F16D 25/10 (2006.01)
(52) U.S. Cl. ............... 192/48.619; 192/48.91
(58) Field of Classification Search ............. 192/87.14, 192/87.11, 87.15; 74/330
See application file for complete search history.

(56) References Cited

U.S. PATENT DOCUMENTS

| | | | | |
|---|---|---|---|---|
| 872,228 | A * | 11/1907 | Sowull et al. ............... | 370/273 |
| 3,498,418 | A * | 3/1970 | Dewar ........................ | 188/71.5 |
| 3,744,605 | A * | 7/1973 | Piret ......................... | 192/70.2 |
| 3,747,727 | A * | 7/1973 | Dach et al. ................. | 192/70.2 |
| 3,915,272 | A * | 10/1975 | Maurice .................... | 192/70.2 |
| 3,922,932 | A | 12/1975 | Maurice et al. | |
| 4,082,171 | A * | 4/1978 | Lalin et al. ................. | 192/70.2 |
| 4,440,282 | A | 4/1984 | Ishimaru et al. | |
| 4,697,477 | A * | 10/1987 | Barr ........................... | 475/154 |
| 4,732,253 | A * | 3/1988 | Hiramatsu et al. ........ | 192/87.11 |
| 6,119,817 | A * | 9/2000 | Niespodziany et al. .... | 188/18 A |
| 6,868,949 | B2 * | 3/2005 | Braford, Jr. ............... | 192/55.61 |
| 7,318,512 | B2 * | 1/2008 | Bauer et al. ............... | 192/87.11 |
| 7,416,069 | B2 * | 8/2008 | Tiesler .................... | 192/87.11 |
| 2005/0103594 | A1 | 5/2005 | Tiesler et al. | |
| 2005/0279605 | A1 * | 12/2005 | Sowul et al. .............. | 192/48.91 |

FOREIGN PATENT DOCUMENTS

GB 1 388 766 A 3/1975
WO WO 2005/019675 A1 * 3/2005

* cited by examiner

Primary Examiner—Rodney H Bonck
(74) Attorney, Agent, or Firm—Warn Partners, P.C.

(57) ABSTRACT

The invention relates to a clutch arrangement in radially nested design. Known in the prior art is a clutch arrangement which comprises a radial outer multiple disk clutch having outer disks and inner disks and a radial inner multiple disk clutch having outer disks and inner disks, where the radial outer multiple disk clutch and the radial inner multiple disk clutch have a common disk support, which supports the outer disks of the radial inner multiple disk clutch and the inner disks of the radial outer multiple disk clutch. According to the invention, a common endplate is provided for the radial inner multiple disk clutch and the radial outer multiple disk clutch. Alternatively or in addition, the invention provides that the common disk support has a hollow cylindrical section with a meander-like cross section, so that on the outer peripheral side an outer toothing is formed for the accommodation of an inner toothing of the inner disks of the radial outer multiple disk clutch and on the inner peripheral side an inner toothing is formed for the accommodation of an outer toothing of the outer disks of the radial inner multiple disk clutch.

5 Claims, 2 Drawing Sheets

CLUTCH ARRANGEMENT HAVING A RADIALLY NESTED DESIGN

CROSS-REFERENCE TO RELATED APPLICATIONS

This application claims priority to European Patent Application No. 05 011339.8 filed on May 25, 2005.

FIELD OF THE INVENTION

The invention relates to a clutch arrangement in radially nested.

BACKGROUND OF THE INVENTION

Multiple clutches for motor vehicles are often classified by their type of friction partner as dry clutches or wet clutches, i.e., cooled by a liquid cooling medium. Multiple clutches, in particular double clutches, may also be classified by their arrangement. Particularly, in the case of wet double clutches, there is the radially nested design ("concentric arrangement"), in which the friction disks of a radial outer clutch, when brought into friction lock, surround the corresponding friction disks of a radial inner clutch, and the axially arranged series design, in which the friction disks of the clutches are arranged in series along a common axis of rotation ("parallel arrangement").

A multiple clutch in parallel design is disclosed, for example, in document EP 1 195 537 A1. Multiple clutches in radially nested design, to which the invention relates, are described for example in EP 0 758 434 B1, DE 101 11 202 A1, DE 102 31 405 A1, DE 102 22 933 A1, DE 203 10 015 U1, DE 102 03 618 A1, DE 102 23 892 A1, DE 100 04 186 A1 or DE 100 04 189 A1.

The clutches proposed in these documents comprise a first clutch, below referred to as a radial outer multiple disk clutch, with an outer disk support supporting at least one outer disk and with an inner disk support supporting at least one inner disk, as well as a second clutch, below referred to as a radial inner multiple disk clutch, with an outer disk support supporting at least one outer disk and with an inner disk support supporting at least one inner disk. The disks of the radial outer multiple disk clutch and the disks of the radial inner multiple disk clutch rotate about a common axis of rotation. There, the disks of the radial outer multiple disk clutch are located radially outside the disks of the radial inner multiple disk clutch, while the disks of the radial outer multiple disk clutch and the disks of the radial inner multiple disk clutch are as a rule located in the same axial section, so that the disks of the radial outer multiple disk clutch reach radially around the disks of the radial inner multiple disk clutch. Each clutch comprises an actuating piston, by means of which the disks of the respective clutch can be brought into friction lock. Each actuating piston is guided axially displaceable by a corresponding cylinder. The cylinder and actuating piston in each instance form a so-called pressure chamber, which by means of a fluid, in particular a hydraulic fluid, can be acted on by a pressure, in order to bring the disks into (or out of) frictional engagement. Frequently, a so-called equalizing piston is in addition assigned to one or both actuating pistons. The actuating piston(s) and equalizing piston form a so-called equalizing chamber. This equalizing chamber may likewise be supplied or filled with a fluid, i.e., for example with hydraulic fluid. The fluid found in this equalizing chamber serves (largely) to equalize any superelevation of pressure in the pressure chamber due to centrifugal force occurring with increasing speed. In some cases, under- or overcompensation of this pressure superelevation may even be desirable.

The clutches proposed in the documents mentioned above are optimized with regard to a wide variety of parameters. Therefore, some of them differ considerably in the space they require for installation.

In most of the multiple clutches presented and described in the printed sources mentioned above, in particular double clutches, the individual disk supports are designed as separate structural parts. In the right-hand half of FIG. 1 of EP 0,758, 434 B1, from which the invention starts out, there is shown a double clutch arrangement in radially nested design, in which the radial outer multiple disk clutch and the radial inner multiple disk clutch have a common disk support, which supports the outer disks of the radial inner multiple disk clutch and the inner disks of the radial outer multiple disk clutch. The common disk support thus results in double utilization, namely as inner disk support of the radial outer clutch and as outer disk support of the radial inner multiple disk clutch.

Both the outer disk support of the radial outer multiple disk clutch and the outer disk support of the radial inner multiple disk clutch support steel disks. The inner disk supports of both clutches support so-called friction disks, which are provided on both faces with a friction lining. For application of the counterforce to the respective disk package upon actuation of the clutches by the actuating piston assigned in each instance, endplates are provided, which close off or support the disk package on the side opposite to the respective actuating piston. These endplates are made of steel disks in both clutches, which are supported by the respective outer disk support and which are stop-limited by a safety ring.

Although each of the clutches has basically proven its worth for the respective application described in the above-mentioned printed sources, a need for improvement still exists.

The object of the invention, therefore, is to keep the space required for installation as small as possible, to keep the number of components necessary for making the clutch arrangement small and to make manufacture as simple as possible.

SUMMARY OF THE INVENTION

The invention is based on the idea that the (necessary) components of the radial inner clutch may be made usable insofar as possible for the radial outer clutch and vice versa. This is accomplished in that a common endplate is provided for the radial inner multiple disk clutch and the radial outer multiple disk clutch for axial support of the closing forces of the two clutches. In addition to a reduction in the individual components required for the multiple clutch, there is a reduction in the number of manufacturing steps necessary for the endplate(s) as such, as well as a reduction in the number of steps required for assembly of the common endplate.

EP 0 758 434 B1 discloses that separate endplates may be provided for support of the respective disk packages of clutches arranged radially nested. The endplates there, in the radial outer multiple disk clutch as well as in the radial inner clutch, are supported by the respective outer disk supports and stop-limited by means of safety rings or spring rings. The accomplishment according to the invention is indicated when the common endplate is either a component of the common disk support or when the common endplate is mounted on the common disk support. In an especially advantageous variant embodiment, the invention therefore provides that the common endplate is connected fixed against rotation with the common disk support or that the common endplate is designed integral with the common disk support.

In the latter variant, it is only by shaping of the disk support, e.g., at an open end, that functionality of the support of the respective disk package of the radial outer multiple disk clutch and the radial inner multiple disk clutch is obtained. Then the common disk support is preferably produced by a molding or drawing process.

The first-mentioned variant of the connection, only fixed against rotation, of the common disk support and common endplate can be realized by a simple toothing connection. Such corresponding toothings are well known in clutch and damper construction in a great variety of variant embodiments. The following variant embodiment is pointed out by way of example: The common endplate may have at least one opening, preferably, however, a plurality of openings located for example on an imaginary circle. These openings are located in such a way that corresponding crosspieces, preferably aligned in the direction of an axis of rotation of the common disk supports, can be passed through them. If the crosspieces (or optionally only one crosspiece) fit into the openings substantially form-lockingly at least in the peripheral direction, the endplate cannot twist against the common disk support.

If the common disk support is connected fixed against rotation with the common endplate by means of corresponding toothings, as a rule axial securing with the aid of a safety ring inserted in a groove is sufficient. In the embodiment of the type described above, it is provided according to the invention that the common disk support has a peripheral groove for the accommodation of a safety ring, by means of which displaceability of the common endplate in an axial direction is limited.

The endplate preferably is designed so that it takes into account the possibly variable maximum force conditions of the respective clutch. In addition, the method disclosed in European patent application No. 04 006 276.2 for optimal design of friction radii may be incorporated into the design of the common endplate and transposed without any problem.

In an especially advantageous variant embodiment of the invention, it is therefore provided that the common endplate has a first spherical hump in order to adjust the average radius of application of force on a disk of the radial outer multiple disk clutch or the radial inner multiple disk clutch adjacent to the common endplate when the first spherical hump is in contact with the adjacent disk of the corresponding multiple disk clutch. By this means and by suitable selection of the radius of the spherical hump, the introduction of (counter) force can be selected on the basis of actuation of the corresponding clutch by means of the actuating piston so that the clutch produces a desired frictional effect and/or that the individual disks of a disk package are upon actuation exposed to a predetermined frictional load and/or temperature load.

Following the teaching of European patent application No. 04 006 276.2 mentioned above, the common endplate may in addition have at least one additional spherical hump, in order to set at least one additional average radius of application of force on the disk of the corresponding multiple disk clutch when the at least one additional spherical hump, additionally or alternatively to the first spherical hump (e.g., in each instance by overpressing of the first spherical hump) is in contact with the adjacent disk of the corresponding multiple disk clutch. In this way, the frictional load and/or the temperature load of the individual disks of a disk package can be adjusted in desired fashion.

Here, too, the invention is based on the idea that (necessary) components of the radial inner clutch may be made usable insofar as possible for the radial outer clutch and vice versa. EP 0 758 434 B1 already discloses the idea that a common disk support may be provided for the inner disks of the radial outer clutch and the outer disks of the radial inner clutch. The common disk support shown in FIG. 1 of this printed source has an outer toothing in which the teeth of the inner toothing of the inner disks of the radial outer clutch can engage. In addition, a separate inner toothing is provided on the inner periphery of the common disk support, which accommodates the outer toothing of the outer disks of the radial inner multiple disk clutch. The separate design of the inner and outer toothings of the common disk support results from the fact that the outer toothing of the outer disks of the radial inner clutch and the inner toothing of the inner disks of the radial outer clutch do not overlap radially.

Now, the invention is based on the idea that the common disk support may be designed in such a way that the outer toothing on the outer peripheral side of the common disk support for the inner disks of the radial outer clutch and the inner toothing on its inner periphery overlap radially. If the common disk support is produced in a drawing or bending process from a metal sheet or the like, when one toothing (e.g., the outer toothing) is shaped, the other toothing (hence the inner toothing in the example) is then automatically produced along with it. The single toothing introduced can thus be used for accommodation of the inner toothing of the inner disks of the outer clutch as well as for accommodation of the outer toothing of the outer disks of the radial inner multiple disk clutch. Consequently, only one toothing need be provided, which at the outer periphery of the common disk support permits engagement of a corresponding inner toothing of the inner disks of the radial outer clutch and at the inner periphery of the common disk support permits engagement of a corresponding outer toothing of the inner disks of the radial inner clutch. According to the invention, the common disk support has a hollow cylindrical section with a meander-like cross section, so that on the outer peripheral side an outer toothing is formed for the accommodation of an inner toothing of the inner disks of the radial outer multiple disk clutch and on the inner peripheral side an inner toothing is formed for the accommodation of an outer toothing of the outer disks of the radial inner multiple disk clutch.

For the sake of completeness, it is pointed out in this connection that such a variant embodiment of a common disk support is also suitable for combination with a common endplate of the type described above and likewise according to the invention.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The invention will now be described in detail with reference to the drawing, wherein.

DETAILED DESCRIPTION OF THE PREFERRED EMBODIMENTS

Figure 1:
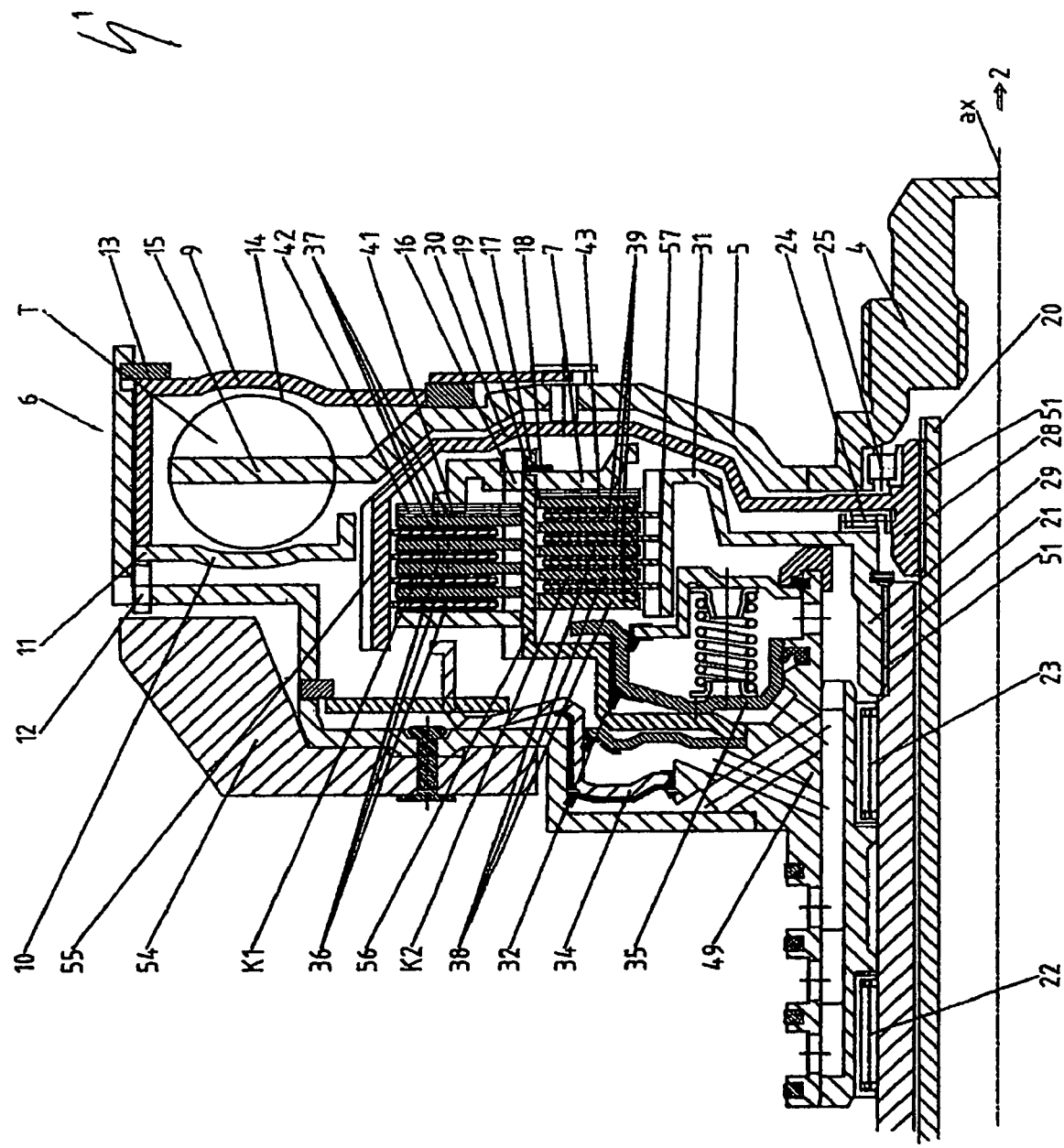
FIG. 1, shows an exemplary embodiment of a double clutch according to the invention in radially nested arrangement in axial half section.

FIG. 1 shows an exemplary embodiment of a double clutching device 1 with torsional vibration damper T and double clutch K1, K2 according to the invention in radially nested arrangement in an axial half section.

The torsional vibration damper T of FIG. 1 of this drawing is basically designed in conventional fashion. It comprises a primary element 5 as a disk, as well as a secondary element 6 with in the present exemplary embodiment two half shells 9, 10, which are connected together fixed against rotation. Primary and secondary elements 5, 6 are coupled together by a spring means and are capable of being twisted against each other about a neutral position. In the present exemplary embodiment, the spring means consists of a plurality of spiral springs 15, arranged in series in the peripheral direction, which are spaced apart from one another by so-called guide shoes/spring dividers, not represented here.

Primary and secondary elements 5, 6 in each instance comprise two drivers in diametral arrangement, which in each instance engage between the series of spiral springs 14 running in the peripheral direction, so that a torque applied to the primary element 5 on the input side is by means of a primary driver 15, represented in FIG. 1, in each instance first transmitted to the spring series consisting of the spiral springs 14 and from there to the respective secondary driver, not represented here, of the secondary element 6.

As already mentioned above, the secondary element 6 comprises two individual parts, namely an input-side half shell 9 and an output-side half shell 10. The two half shells 9, 10 are designed in such a way as to accommodate the series consisting of spiral springs 14 substantially form-lockingly. The two half shells 9, 10 are connected together fixed against rotation by a toothing 11. These two half shells 9, 10 serve for preferably low-friction guidance of the springs 14 and the guide shoes/spring dividers located between the springs 14 in the peripheral direction.

The double clutch in the radially nested arrangement is also constructed in conventional fashion. It comprises a radial outer clutch K1 and a radial inner clutch K2.

The radial outer clutch K1 comprises an outer disk support 30 and an inner disk support 32. The two disk supports 30, 32 are designed in the form of half shells. The cylindrical part 55 of the outer disk support 30 has a toothing 26 at the inner periphery. A corresponding outer toothing 58 of outer disks 36, designed as steel disks in the present exemplary embodiment, engages in this toothing 26 in each instance. In corresponding fashion, the cylindrical part 56 of the inner disk support 32 has at its outer periphery a toothing 46, in which engages a corresponding inner toothing 44 of inner disks 37, here designed as lining disks. Outer disks 36 and inner disks 37 are introduced between the cylindrical regions of the outer and inner disk supports 30, 32 in such a way that in each instance an outer disk 36 is followed by an inner disk 37 and vice versa. The outer and inner disks 36, 37 are capable of being brought into and out of frictional engagement by means of an actuating piston 34.

The radial inner clutch K2 is designed in basically the same way. Here, too, a half shell-shaped outer disk support 32 and a half shell-shaped inner disk support 31 are provided. At the same time, the half shell-shaped outer disk support 32 is formed by the inner disk support 32 supporting the inner disks 37 of the radial outer clutch K1. Hence, only one common disk support 32 exists, which supports the inner disks 37 of the radial outer clutch K1 as well as the outer disks 38 of the radial inner clutch K2.

The cylindrical part of this common disk support 32 has on the inner peripheral side a toothing 47, in which engages an outer toothing 45 of corresponding outer disks 38, designed as steel disks. Corresponding to this, the cylindrical section 57 of the inner-disk-support half shell 31 has an outer toothing 27, which is able to accommodate the inner toothings 59 of corresponding inner disks 39. An inner disk 39 is thereby alternately located adjacent to an outer disk 38 forming a disk package. The outer and inner disks 38, 39 may be brought into and out of frictional engagement by an actuating piston 35.

The disk packages of the radial outer clutch K1 and the radial inner clutch K2 are arranged in radially nested fashion to each other. This means that the disk package of the radial inner clutch K2 is located radially within the disk package of the radial outer clutch K1 and in approximately the same axial section as the disk package of the radial outer multiple disk clutch K1.

The common disk support 32 of the radial outer clutch K1 and the radial inner clutch K2 is connected fixed against rotation with a clutch hub 49. This clutch hub 49, which has substantially the shape of a cylinder, is seated rotating about an axis of rotation on the outer periphery of an input gear shaft 21. The rotating seating is effected by two radial needle bearings 22, 23.

The input gear shaft 21 is designed as a hollow cylinder. It is penetrated centrally by an additional input gear shaft 22 designed as a solid shaft. On a hub 28, connected fixed against rotation with this inner input gear shaft 20, the solid shaft, is seated rotating the primary element 5 of the torsional vibration damper T by a corresponding primary flange 4 rotating about the common axis of rotation ax. In the present exemplary embodiment, seating is effected by means of a radial needle bearing 25.

The two input gear shafts, namely the hollow shaft 21 and the solid shaft 20, are in each instance connected fixed against rotation with a disk support 30, 31 of one of the two clutches K1, K2. In particular, the outer disk support 30 of the radial outer multiple disk clutch K1 is connected rotating with the solid shaft 20 and the inner disk support 31 of the radial inner clutch K2 is connected rotating with the hollow shaft 21. For this purpose, the disk supports 30, 31 have corresponding hubs 28, 29, which at their respective inner periphery in each instance have a plug-in toothing 51, 52 for the accommodation of corresponding toothings of the input gear shafts 20, 21. The two disk supports, namely the outer disk support 30 of the radial outer multiple disk clutch K1 and the inner disk support 31 of the radial inner multiple disk clutch K2, are guided rotating with respect to each other in the hub region by means of an axial needle bearing 24.

The clutch hub 49 and the common disk support 30 of the radial outer clutch K1 and the radial inner clutch K2, connected fixed against rotation with the latter, now represent the input side of the double clutch. The outer disk support 30 of the radial outer multiple disk clutch K1 and the inner disk support 31 of the clutch K2 form the output sides of the double clutch. A torque introduced via the clutch hub 49 and the common disk support 32 accordingly may be selectively transmitted, depending upon the position of the two actuating pistons 34, 35, to one of the two disk supports 31 or 30 and from there be carried on via the corresponding hubs 28, 29 to the input gear shafts 20, 21.

In order to be able to transmit a torque produced for example by a combustion engine, not shown here, and transmitted to a crankshaft 2, likewise not shown, via the torsional vibration damper T to the double clutch and from there on to one of the two output gear shafts 20, 21, a clutch fixed against rotation between the torsional vibration damper T and the double clutch K1, K2 is required. In the present exemplary embodiment, this clutch is realized in that to the clutch hub 49 is bolted a half shell-shaped housing part 54, which reaches axially around the clutches K1, K2 and the torsional vibration damper T and which is connected fixed against rotation with the secondary element 6 by a toothing 12. A safety ring 13, which keeps the entire structural unit 1 of torsional vibration damper T and double clutch K1, K2 substantially immovable axially with respect to each other, is provided for axial securing.

The invention now relates substantially to two aspects of the double clutch in radially nested arrangement.

The first aspect relates to the design of the common disk support 32. As already explained above, the common disk support 32 comprised a hollow cylindrical section 56, which has toothings 46, 47, in order to accommodate corresponding toothings 44 of the inner disks 37 of the radial outer multiple disk clutch K1 as well as toothings 45 of the outer disks 38 of the radial inner multiple disk clutch K2.

Figure 2:
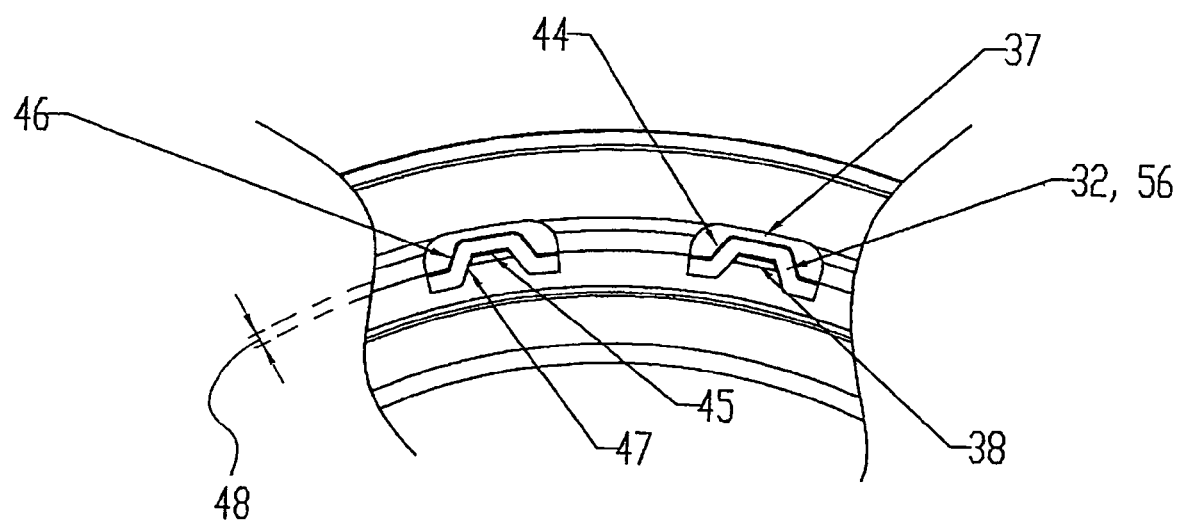
FIG. 2, a cross section of the double clutch in the region of the hollow cylindrical section of the common inner disk support.

FIG. 2 shows this hollow cylindrical section 56 of the common disk support 32 in cross section. It can be seen in FIG. 2 that the common disk support 32 has a hollow cylindrical section 56 with a meander-like cross section, so that simultaneously, on the one hand, on the outer peripheral side an outer toothing 46 is formed for the accommodation of an inner toothing 44 of the inner disks 37 of the radial outer multiple disk clutch K1 and, on the other hand, on the inner peripheral side an inner toothing 47 is formed for the accommodation of an outer toothing 45 of the outer disks 38 of the radial inner multiple disk clutch K2. This design of the common disk support 32 thus permits double utilization (inner and outer) of the disk-support toothing formed by the meander shape.

The second aspect of the invention relates to the axial supporting plates against which the respective disk packages are supported in case of actuation of the corresponding clutches K1, K2, the so-called endplates. While in the prior art, each clutch K1, K2 has its own endplate for support, according to the invention a common endplate 7 is provided, against which the disk package of the radial inner multiple disk clutch K2 as well as the disk package of the radial outer multiple disk clutch K1 are supported at the end side.

The common endplate 7 has for the production of a connection fixed against rotation between the common endplate 7 and the common disk support 32 a plurality of openings 16 located on an imaginary circle, through which are guided corresponding crosspieces 17 aligned in the direction of the axis of rotation ax of the common disk support 32. The common disk support 32 has a peripheral groove 19 for the accommodation of a safety ring 18, by means of which displaceability of the common endplate 7 in the axial direction ax is limited.

The part of the common endplate 7 assigned to the inner clutch K2 has a spherical hump 43, used to adjust an average radius of application of force to the adjacent disk of the radial inner multiple disk clutch. The section of the common endplate 7 assigned to the radial outer clutch K1 in fact has two spherical humps 41, 42, so that depending upon input of force by the actuating pistons 34 either the radially outer spherical hump 42 or the radially inner spherical hump 41 comes into contact with the adjacent inner disk. In this way, depending upon the input of force by the actuating piston 34, another average radius of application of force is established.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. Clutch arrangement in radially nested configuration, said clutch arrangement comprising:
   radial outer multiple disk clutch having outer disks and inner disks;
   radial inner multiple disk clutch having outer disks and inner disks;
   a common disk support for the radial outer multiple disk clutch and the radial inner multiple disk clutch, the common disk support being operable for supporting the outer disks of the radial inner multiple disk clutch and the inner disks of the radial outer multiple disk clutch;
   a common endplate is provided for the radial inner multiple disk clutch and the radial outer multiple disk clutch; and
   a hollow cylindrical section with a meander-like cross section formed as part of the common disk support about an axis of rotation of the common-disk support, so that on the outer peripheral side an outer toothing is formed for the accommodation of an inner toothing of the inner disks of the radial outer multiple disk clutch and on the inner peripheral side an inner toothing is formed for the accommodation of an outer toothing of the outer disks of the radial inner multiple disk clutch such that the inner toothing of the inner disks of the radial outer multiple disk clutch overlap radially with the outer toothing of the outer disks of the radial inner multiple disk clutch;
   said radial outer multiple disk clutch being located radially within said radial outer multiple disk clutch and in partially the same axial section as the disk package of the radial outer multiple disk clutch, wherein the common disk support has a peripheral groove for the accommodation of a safety ring for limiting the displaceability of the common endplate in an axial direction.

2. Clutch arrangement according to claim 1, wherein the common disk support is designed as a molded or drawn part.

3. Clutch arrangement according to claim 1, wherein the common endplate is connected fixed against rotation with the common disk support or in that the common endplate is designed integral with the common disk support.

4. Clutch arrangement according to claim 3, wherein the common endplate has a plurality of openings located on an imaginary circle, through which are guided corresponding crosspieces, aligned in the direction of an axis of rotation of the common disk support.

5. Clutch arrangement according to claim 1, wherein the common endplate is designed as a molded part.

* * * * *